(12) United States Patent
Kihara

(10) Patent No.: US 7,740,983 B2
(45) Date of Patent: *Jun. 22, 2010

(54) ALKALINE STORAGE CELL

(75) Inventor: Masaru Kihara, Takasaki (JP)

(73) Assignee: Sanyo Electric Co., Ltd., Moriguchi-shi (JP)

(*) Notice: Subject to any disclaimer, the term of this patent is extended or adjusted under 35 U.S.C. 154(b) by 942 days.

This patent is subject to a terminal disclaimer.

(21) Appl. No.: 11/362,334

(22) Filed: Feb. 27, 2006

(65) Prior Publication Data

US 2006/0194105 A1 Aug. 31, 2006

(30) Foreign Application Priority Data

Feb. 28, 2005 (JP) ............... 2005-053436

(51) Int. Cl.
*H01M 4/58* (2010.01)
*H01M 4/48* (2010.01)

(52) U.S. Cl. .............. 429/218.2; 429/231; 429/231.6

(58) Field of Classification Search .............. 429/218.2, 429/223, 231.6; 420/900
See application file for complete search history.

(56) References Cited

U.S. PATENT DOCUMENTS

| 2003/0017396 A1* | 1/2003 | Harigae et al. ............... 429/229 |
| 2004/0209166 A1 | 10/2004 | Kihara |
| 2006/0257701 A1* | 11/2006 | Schumm ...................... 429/27 |

FOREIGN PATENT DOCUMENTS

| CN | 1505197 A | 6/2004 |
| JP | 08-050918 A | 2/1996 |
| JP | 08138658 | * 5/1996 |
| JP | 2000-021439 A | 1/2000 |
| JP | 2000-73132 | 3/2000 |
| JP | 2000-149956 A | 5/2000 |
| JP | 2000-195509 A | 7/2000 |
| JP | 2001-291510 A | 10/2001 |
| JP | 2003-132940 A | 5/2003 |
| JP | 2004-063339 A | 2/2004 |

OTHER PUBLICATIONS

Chinese Office Action dated Dec. 7, 2007, issued in corresponding Chinese Patent Application No. 2006100514655 and English translation.

* cited by examiner

Primary Examiner—Patrick Ryan
Assistant Examiner—Muhammad Siddiquee
(74) Attorney, Agent, or Firm—Westerman, Hattori, Daniels & Adrian, LLP

(57) ABSTRACT

An alkaline storage cell has a negative electrode containing hydrogen-storing alloy powder, additive powder containing metal zinc or zinc compound, and a binding agent for binding particles of the powders. The hydrogen-storing alloy powder has a composition expressed by a general expression: $Ln_{1-x}Mg_x(Ni_{1-y}T_y)_z$, where Ln represents at least one element chosen from a group consisting of the lanthanoids, Ca, Sr, Sc, Y, Ti, Zr and Hf, T represents at least one element chosen from a group consisting of V, Nb, Ta, Cr, Mo, Mn, Fe, Co, Al, Ga, Zn, Sn, In, Cu, Si, P and B, and x, y and z represent numerical values which meet $0<x<1$, $0 \leq y \leq 0.5$ and $2.5 \leq z \leq 4.5$.

5 Claims, 1 Drawing Sheet

FIGURE
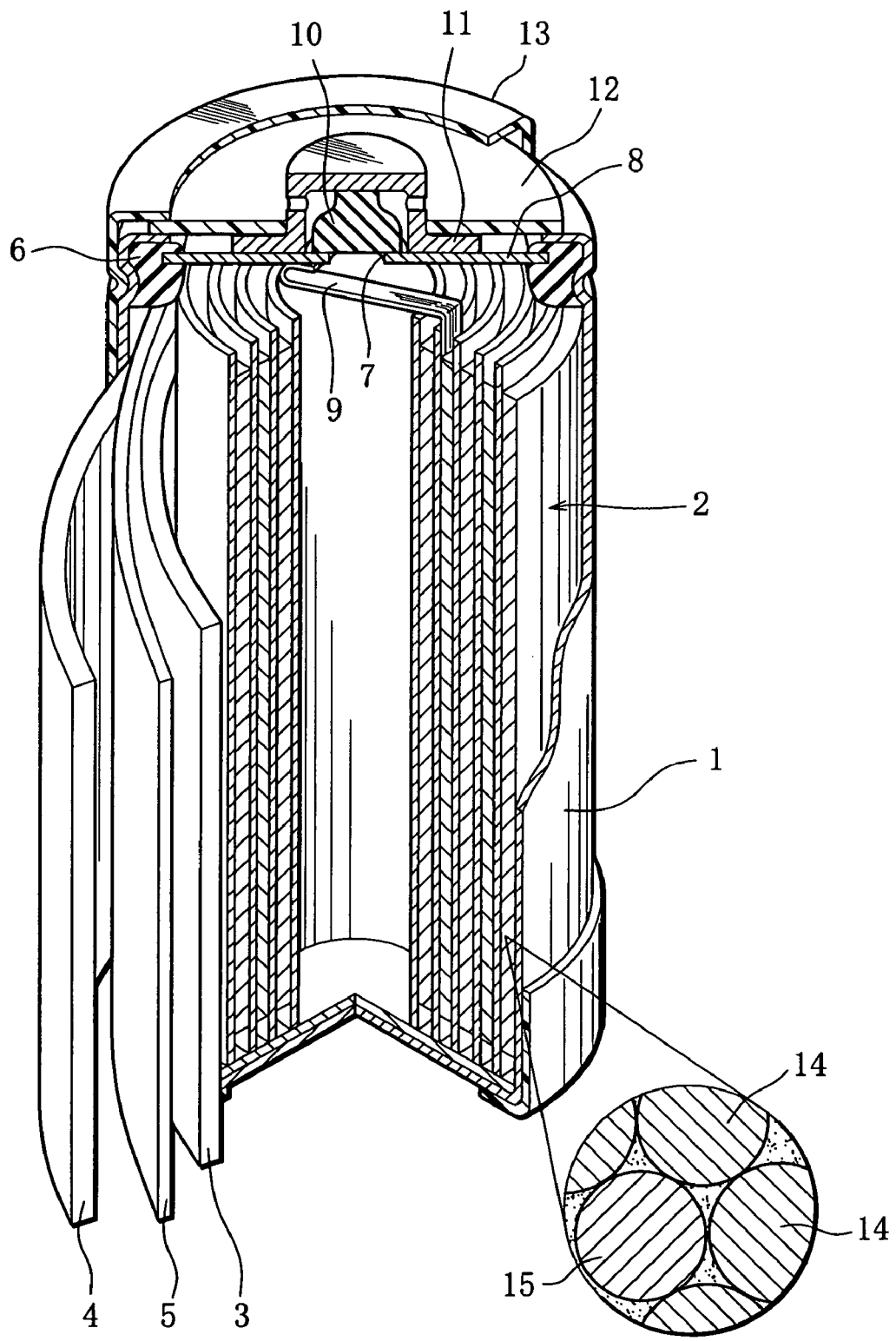

ALKALINE STORAGE CELL

BACKGROUND OF THE INVENTION

1. Field of the Invention

This invention relates to an alkaline storage cell using hydrogen-storing alloy for the negative electrode.

2. Description of the Related Art

There is a great demand for the alkaline storage cell using hydrogen-storing alloy for the negative electrode, for consumer use, because of its characteristics such that it has a high capacity and that it is cleaner than the cells using lead or cadmium.

Specifically, for this type of alkaline storage cell, $AB_5$-type rare-earth alloy such as $LaNi_5$ is generally used. However, the discharge capacity of the cell using this type of alloy already exceeds 80% of the theoretical capacity, so that the possibility of further enhancing the capacity is limited. Meanwhile, the rare earth-Mg—Ni hydrogen-storing alloy obtained by replacing the rare-earth element in the $AB_5$-type rare-earth alloy partly with Mg has a characteristic that it can store a larger amount of hydrogen gas than the $AB_5$-type rare-earth alloy at temperatures close to room temperature. Hence, as disclosed in Japanese Unexamined Patent Publication No. 2000-73132, the development of the alkaline storage cell using the rare-earth magnesium alloy has been being advanced.

The alkaline storage cell using the rare earth-Mg—Ni hydrogen-storing alloy disclosed in the above-mentioned publication has, however, a problem that decrease in operating voltage due to repetition of a charge/discharge cycle occurs earlier, compared with the alkaline storage cell using the $AB_5$-type rare-earth alloy.

SUMMARY OF THE INVENTION

The object of this invention is to provide an alkaline storage cell having a negative electrode containing rare earth-Mg—Ni hydrogen-storing alloy, having a high capacity and a good charge/discharge-cycle characteristic.

Conducting studies to achieve this object, the inventor found out correlation between decrease in operating voltage and increase in Mg in the positive electrode. By conducting further studies to suppress the increase in Mg in the positive electrode, the inventor obtained the knowledge that the decrease in operating voltage due to repetition of the charge/discharge cycle can be suppressed by adding metal zinc or zinc compound for the negative electrode, and reached this invention.

In order to achieve the above object, an alkaline storage cell according to this invention comprises an electricity generation set contained in a container. The electricity generation set includes a positive electrode, a negative electrode and an alkaline electrolyte. The negative electrode contains hydrogen-storing alloy powder, additive powder containing at least one of zinc and zinc compound, and a binding agent for binding particles of the powders. The hydrogen-storing alloy powder has a composition expressed by a general expression:

$$Ln_{1-x}Mg_x(Ni_{1-y}T_y)_z$$

where Ln represents at least one element chosen from a group consisting of La, Ce, Pr, Nd, Pm, Sm, Eu, Gd, Tb, Dy, Ho, Er, Tm, Yb, Lu, Ca, Sr, Sc, Y, Ti, Zr and Hf, T represents at least one element chosen from a group consisting of V, Nb, Ta, Cr, Mo, Mn, Fe, Co, Al, Ga, Zn, Sn, In, Cu, Si, P and B, and x, y and z represent numerical values which meet $0<x<1$, $0 \leq y \leq 0.5$ and $2.5 \leq z \leq 4.5$.

The alkaline storage cell according to this invention is suited to enhance the capacity, since the hydrogen-storing alloy powder contains rare earth-Mg—Ni alloy having the specified composition.

Further, in the alkaline storage cell according to this invention, decrease in operating voltage due to repetition of a charge/discharge cycle is suppressed, since the negative electrode contains additive powder contains one of metal zinc and zinc compound.

In a preferred arrangement, the additive powder contains at least one zinc compound chosen from a group consisting of zinc carbonate, zinc sulfate, zinc hydroxide and zinc oxide.

In a preferred arrangement, the amount of the additive powder contained in the negative electrode is in a range of 0.5 to 5.0 mass-parts relative to 100 mass-parts of the hydrogen-storing alloy powder. In this arrangement, since the amount of the additive powder contained in the negative electrode is in the range of 0.5 to 5.0 mass-parts relative to 100 mass-parts of the hydrogen-storing alloy powder, decrease in operating voltage due to repetition of the charge/discharge cycle is more suppressed.

In a preferred arrangement, an initial charging of the electricity generation set is performed two hours or more after arranging the electricity generation set in the container. In this arrangement, since the electricity generation set is one which was subjected to initial charging two hours or more after it was arranged in the container, decrease in operating voltage due to repetition of the charge/discharge cycle is more suppressed.

In a preferred arrangement, the electricity generation set is heated at 40° C. or higher after arranging the electricity generation set in the container, before performing an initial charging of the electricity generation set. In this arrangement, since the electricity generation set is one which was heated at 40° C. or higher after arranged in the container, before subjected to initial charging, decrease in operating voltage due to repetition of the charge/discharge cycle is more suppressed.

BRIEF DESCRIPTION OF THE DRAWING

The present invention will become more fully understood from the detailed description given hereinbelow and the accompanying drawing which is given by way of illustration only, and thus, is not limitative of the present invention, and the FIGURE is a perspective cutaway view showing an alkaline storage cell in an embodiment of this invention, where, within the circle, part of a negative-electrode plate is schematically shown on an enlarged scale.

DETAILED DESCRIPTION

As an alkaline storage cell in an embodiment of the present invention, a nickel-hydrogen secondary cell will be described below in detail.

As shown in the FIGURE, the cell has an exterior can 1 in the form of a cylinder closed at the bottom and open at the top. The exterior can 1 contains an electrode assembly 2. The electrode assembly 2 consists of a positive electrode 3, a negative electrode 4 and a separator 5 which are rolled up with the separator 5 inserted between the positive electrode 3 and the negative electrode 4, to form a spiral-like shape. The outermost cylindrical part of the electrode assembly 2 is formed by the outermost turn of the negative electrode 4 so that the negative electrode 4 is electrically connected with the inner cylindrical surface of the exterior can 1. The exterior can 1 also contains an alkaline electrolyte (not shown). The positive electrode 3, the negative electrode 4 and the alkaline electrolyte form an electricity generation set.

As the alkaline electrolyte, an aqueous potassium hydroxide solution, or a mixture thereof with an aqueous sodium hydroxide solution, an aqueous lithium hydroxide solution or the like can be used, for example.

Within the opening at the top of the exterior can 1, a disk-shaped cover plate 8 with a gas release hole 7 in the center is arranged with a ring-shaped insulating gasket 6. The cover plate 8 and the insulating gasket 6 are fixed by crimping the top end of the exterior can 1. A positive-electrode lead 9 is arranged between the positive electrode 3 of the electrode assembly 2 and the inner surface of the cover plate 8 to connect them electrically. On the outer surface of the cover plate 8, a valve body 10 of rubber is arranged to cover the gas release hole 7, and further a positive-electrode terminal 11 in the form of a cylinder with a flange is fitted to cover the valve body 10.

Further, an annular insulating plate 12 is arranged at the open end of the exterior can 1, and the positive-electrode terminal 11 projects through the insulating plate 12 outward. Reference sign 13 indicates an exterior tube. The exterior tube 13 covers the peripheral part of the insulating plate 12, the outer cylindrical surface of the exterior can 1 and the peripheral part of the bottom of the exterior can 1.

The positive electrode 3 and the negative electrode 4 will be described below more in detail.

<Positive Electrode>

The positive electrode 3 consists of a conductive positive-electrode substrate and a positive-electrode mixture supported by the positive-electrode substrate. For the positive-electrode substrate, a net-, sponge-, fiber- or felt-like porous metal material plated with nickel can be used, for example.

The positive-electrode mixture contains nickel hydroxide powder as a positive-electrode active material, an additive and a binding agent, where it is desirable that the surface of particles of nickel hydroxide powder be at least partly covered with a cobalt compound. The nickel hydroxide powder may be a solid solution containing cobalt and zinc.

As an additive, a conducting agent such as powder of cobalt oxide, cobalt hydroxide, metal cobalt or the like can be used, for example. As the binding agent, carboxymethylcellulose, methylcellulose, PTFE dispersion, HPC dispersion or the like can be used, for example.

The positive electrode 3 can be made, for example, by applying a positive-electrode slurry to a positive-electrode substrate, drying the positive-electrode substrate, and then rolling and cutting the positive-electrode substrate. The positive-electrode slurry is prepared by mixing and kneading the nickel hydroxide powder, the conducting agent, the binding agent and water.

<Negative Electrode>

The negative electrode 4 consists of a conductive negative-electrode substrate and a negative-electrode mixture supported by the negative-electrode substrate. For the negative-electrode substrate, punching metal can be used, for example.

The negative-electrode mixture contains hydrogen-storing alloy powder, additive powder, a binding agent, and when necessary, a conducting agent. As the binding agent, the same substance as that used for the positive-electrode mixture can be used, where another substance such as sodium polyacrylate can be used together. As the conducting agent, carbon powder can be used, for example. Within the circle of the FIGURE, particles 14 of hydrogen-storing alloy powder and particles 15 of additive powder are shown schematically.

The hydrogen-storing alloy powder for the negative electrode 4 is a rare earth-Mg—Ni alloy of composition expressed by general expression (I):

$$Ln_{1-x}Mg_x(Ni_{1-y}T_y)_z$$

where Ln represents at least one element chosen from a group consisting of La, Ce, Pr, Nd, Pm, Sm, Eu, Gd, Tb, Dy, Ho, Er, Tm, Yb, Lu, Ca, Sr, Sc, Y, Ti, Zr and Hf; T represents at least one element chosen from a group consisting of V, Nb, Ta, Cr, Mo, Mn, Fe, Co, Al, Ga, Zn, Sn, In, Cu, Si, P and B; and x, y and z represent numerical values which meet $0<x<1$, $0 \leq y \leq 0.5$ and $2.5 \leq z \leq 4.5$.

As the additive powder for the negative electrode 4, metal zinc powder, zinc compound powder or a mixture of metal zinc powder and zinc compound powder can be used. More specifically, as the zinc compound, one or more chosen from zinc carbonate, zinc sulfate, zinc hydroxide and zinc oxide can be used, where zinc oxide is particularly desirable.

The negative electrode 4 can be made, for example, by applying a negative-electrode slurry to a negative-electrode substrate, drying the negative-electrode substrate and then rolling and cutting the negative-electrode substrate. The negative-electrode slurry is prepared by mixing and kneading the hydrogen-storing alloy powder, additive powder, a binding agent, water, and when necessary, a conducting agent.

The hydrogen-storing alloy powder is made, for example, as follows:

Metal materials are measured out to produce the composition expressed by general expression (I) and mixed. The mixture is melted, for example, in a high-frequency melting furnace and formed into an ingot. The ingot obtained is subjected to heat treatment in which the ingot is heated at temperatures 900 to 1200° C. in an inert gas atmosphere for 5 to 24 hours to thereby change the crystal structure of the ingot to a super-lattice structure such that $AB_5$ structure and $AB_2$ structure are merged. Then, the ingot is pulverized and the particles obtained are sieved to separate those of a desired particle size as hydrogen-storing alloy powder.

The above-described nickel-hydrogen secondary cell is assembled by putting the electrode assembly 2 into the exterior can 1 and fitting it according to specified steps, then introducing the alkaline electrolyte, and then closing the opening of the exterior can 1 using the cover plate 6, etc. The nickel-hydrogen secondary cell assembled is left to rest in an room-temperature environment of 25° C. for two hours or more, and then conditioned by carrying out initial charging under specified conditions (temperature, charging current, charging time).

This nickel-hydrogen secondary cell is suited to enhance the capacity, since it uses, for the hydrogen-storing alloy powder, a rare earth-Mg—Ni alloy of composition expressed by general expression (I), which stores a large amount of hydrogen at room temperature.

Further, in this nickel-hydrogen secondary cell, since the negative electrode 4 contains the additive powder of metal zinc or zinc compound, decrease in operating voltage due to repetition of the charge/discharge cycle is suppressed. The reason for this is thought to be that zinc is more soluble in the alkaline electrolyte than Mg, so that zinc contained in the additive powder dissolves into the alkaline electrolyte, which suppresses Mg in the hydrogen-storing alloy powder dissolving into the alkaline electrolyte and becoming precipitated on the positive electrode 4.

In this nickel-hydrogen secondary cell, it is desirable that the amount of the additive powder contained in the negative electrode 4 be in the inclusive range of 0.5 mass-parts to 5.0 mass-parts relative to 100 mass-parts of the hydrogen-storing alloy powder. If the amount of the additive powder contained is smaller than 0.5 mass-parts, decrease in operating voltage cannot be suppressed satisfactorily. If the amount of the additive powder contained is greater than 5.0 mass-parts, it causes decrease in negative-electrode capacity while the degree of suppression of decrease in operating voltage becomes saturated. It is more desirable that the amount of the additive powder contained in the negative electrode 4 be in the range of 1.5 mass-parts to 2.5 mass-parts relative to 100 mass-parts of the hydrogen-storing alloy powder.

The reason why, in general expression (I) for this nickel-hydrogen secondary cell, x is set to meet $0<x<1$ is that if x is zero (namely, Mg is not contained), or 1 or greater, the property of storing a large amount of hydrogen at room temperature, which is the property characteristic of the rare earth-Mg—Ni alloy, is lost.

In general expression (I), if z is too small, the stability of hydrogen stored in the hydrogen-storing alloy increases, so that the hydrogen-releasing capacity deteriorates. Meanwhile, if z is too great, the number of hydrogen-storing sites in the hydrogen-storing alloy decreases, so that the hydrogen-storing capacity begins to deteriorate. Hence, z is set to meet $2.5 \leq z \leq 4.5$.

In general expression (I), y represents the amount of the replacement element T with which Ni is replaced. If y is too great, the hydrogen-storing alloy changes in crystal structure and begins to lose the hydrogen-storing/releasing capacity, and the replacement element T begins to dissolve into the alkaline electrolyte, form a complex and become precipitated on the separator, which lowers the long-term storage quality of the cell. Hence, y is set to meet $0 \leq y \leq 0.5$.

Further, it is desirable that in general expression (I), the mol ratio of La to Ln be not greater than 0.3 and/or the mol ratio of Nd to Ln be not smaller than 0.15. The reason is that if the amount of La, which easily reacts with the alkaline electrolyte to form hydroxide, is greater, the electrolyte contained in the cell is consumed (the concentration of the electrolyte decreases) to a greater degree, which tends to cause the zinc compound to dissolve into the electrolyte in a different way from the way intended when the cell was designed. For a similar reason, it is desirable that the amount of Nd, which is a rare-earth element having high oxidation resistance, be greater than a certain level. When Ln has a composition which meets these limitations, the hydrogen-storing alloy powder well matches zinc added as the additive powder, so that a satisfactory effect is produced.

The present invention is not limited to the above-described embodiment but can be modified in various ways. The cell can be rectangular in shape, and the mechanical structure of the cell is not limited to a particular one.

Although, in the described embodiment, the nickel-hydrogen secondary cell is subjected to initial charging after left to rest for two hours or more after assembly, it can be subjected to initial charging immediately after assembly. However, it is preferable to subject the nickel-hydrogen secondary cell to initial charging, two hours or more after assembly, as in the described embodiment. In other words, it is desirable that the nickel-hydrogen secondary cell have an electricity generation set which was subjected to initial charging two hours or more after it was arranged in the exterior can 10 as a container. The reason is that, by leaving the cell (electricity generation set) to rest for two hours or more, the amount of zinc dissolving from the additive powder into the alkaline electrolyte increases, so that the amount of Mg dissolving from the hydrogen-storing alloy powder into the alkaline electrolyte further decreases. It is more desirable that the cell be left to rest for 24 hours or more.

Although, in the described embodiment, the nickel-hydrogen secondary cell is left to rest in an environment of 25° C. after assembly until initial charging, it is desirable that the temperature of the environment in which the cell is left to rest be 40° C. or higher. In other words, it is desirable that the nickel-hydrogen secondary cell have an electricity generation set which was heated at 40° C. or higher after arranged in the exterior can 1, before subjected to initial charging. The reason is that, by leaving the cell (electricity generation set) to rest in an environment of 40° C. or higher, the amount of zinc dissolving from the additive powder into the alkaline electrolyte increases, so that the amount of Mg dissolving from the hydrogen-storing alloy powder into the alkaline electrolyte further decreases. It is more desirable that the temperature of the environment in which the cell is left to rest be 45° C. or higher.

The alkaline storage cell according to the present invention is applicable not only to the nickel-hydrogen secondary cell but also to other types of alkaline storage cell having a negative electrode containing hydrogen-storing alloy powder.

EXAMPLES

Example 1

1. Preparation of a Negative Electrode

Metal materials were measured out to produce the composition $(La_{0.20}Ce_{0.05}Pr_{0.35}Nd_{0.35}Y_{0.05})_{0.7}Mg_{0.3}Ni_{2.5}Co_{0.5}$ and mixed. The mixture was melted in a high-frequency melting furnace and formed into an ingot. The ingot was heated in an argon atmosphere of 1000° C. for 10 hours to thereby change the crystal structure of the ingot to a superlattice structure such that $AB_5$ structure and $AB_2$ structure are merged. Then, the ingot was mechanically pulverized in an inert gas atmosphere and sieved to thereby obtain rare earth-Mg—Ni alloy powder having the above composition. The average particle size corresponding to weight integral 50% of the rare earth-Mg—Ni alloy powder obtained, measured using a laser diffraction scattering particle-size distribution measurement device, was 30 μm.

To 98 mass-parts of the alloy powder obtained, 2 mass-parts of zinc oxide (ZnO) as additive powder, 0.4 mass-parts of sodiumpolyacrylate, 0.1 mass-parts of carboxymethylcellulose and 0.5 mass-parts of PTFE dispersion (medium: water, 60 mass % of solids) were added, and all the materials were mixed and kneaded to obtain negative-electrode slurry. A nickel-plated iron punching sheet coated with the negative-electrode slurry was dried, then rolled and cut to obtain a negative electrode for size AA.

2. Preparation of a Positive Electrode

To a mixed aqueous solution of nickel sulfate, zinc sulfate and cobalt sulfate prepared so that the proportions of zinc and cobalt relative to nickel were 3 mass % and 1 mass %, respectively, an aqueous solution of sodium hydroxide was gradually added, while the mixture was being stirred, to thereby cause reaction. By keeping the pH of the mixed solution in the range of 13 to 14 during the reaction, nickel hydroxide powder in the form of a solid solution containing zinc and cobalt was obtained as a precipitate.

The precipitated nickel hydroxide powder was washed with ten times as much pure water, three times, then dehydrated and dried. The nickel hydroxide powder obtained was mixed with 40 mass % HPC dispersion to prepare positive-electrode slurry. A nickel porous sheet packed and coated with this positive-electrode slurry was dried and then rolled and cut to form a positive electrode.

3. Assembly of a Nickel-Hydrogen Secondary Cell

The negative electrode and positive electrode obtained were rolled up with a separator of polypropylene fiber non-woven fabric inserted therebetween, to form an electrode assembly. After the electrode assembly obtained was put in an exterior can and fitted to it according to specified steps, a 30 mass % aqueous potassium hydroxide solution containing lithium and sodium was introduced into the exterior can. By closing the opening of the exterior can using a cover plate, etc., a closed cylindrical nickel-hydrogen secondary cell of size AA and volumetric energy density 300 Wh/l was obtained as example 1. Cell example 1 was left to rest for 1 hour, after assembly until initial charging for conditioning. While the cell was left to rest, the temperature of the environment in which the cell was left was kept at 25° C.

Initial charging were carried out under the conditions that the temperature was 25° C., the current was 700 mA, and the charging time was 4 hours.

Example 2

A nickel-hydrogen secondary cell was assembled and left to rest in the same way as example 1, except that the amount of ZnO added was 5.0 mass-parts.

Example 3

A nickel-hydrogen secondary cell was assembled and left to rest in the same way as example 1, except that 2.0 mass-parts of zinc hydroxide ($Zn(OH)_2$) was added in place of ZnO.

Example 4

A nickel-hydrogen secondary cell was assembled and left to rest in the same way as example 1, except that the cell was left to rest for 2 hours.

Example 5

A nickel-hydrogen secondary cell was assembled and left to rest in the same way as example 1, except that the temperature of the environment in which the cell was left to rest was 40° C.

Example 6

A nickel-hydrogen secondary cell was assembled and left to rest in the same way as example 1, except that the amount of ZnO added was 8.0 mass-parts.

Comparative Example 1

A nickel-hydrogen secondary cell was assembled and left to rest in the same way as example 1, except that ZnO was not added.

Comparative Example 2

A nickel-hydrogen secondary cell was assembled and left to rest in the same way as example 1, except that $AB_5$ type hydrogen-storing alloy powder having a composition $La_{0.90}Ce_{0.06}Pr_{0.02}Nd_{0.02}Ni_{4.0}Co_{0.8}Al_{0.3}Mn_{0.3}$ was used in place of the rare earth-Mg—Ni alloy.

4. Evaluation of Properties of Cells

Regarding the nickel-hydrogen secondary cells in examples 1 to 6 and comparative examples 1 and 2 which had been subjected to initial charging and then to discharging with a current of 1250 mA, at 25° C., for 2 hours, the following properties were evaluated.

1) Life

For each cell, in an environment of 25° C., the charge/discharge cycle in which the cell was charged with a current of 250 mA for 16 hours and then discharged with a current of 1250 mA up to a voltage 0.5V was repeated until the discharge capacity decreased to 60% or lower of the initial discharge capacity (discharge capacity in the first cycle). The number of cycles repeated, expressed as a relative value, where the number of cycles repeated for the cell in comparative example 1 is considered as 100, is shown in Table 2 as life.

2) Operating Voltage

While the charge/discharge cycle was repeated this way, also the operating voltage was measured in the first and hundredth cycles. The measurement expressed as a relative value, where the operating voltage in the cell in example 1 measured in the first cycle is considered as 100, is shown in Table 2.

3) The Amount of Mg

After 100 cycles of charge/discharge, each cell was disassembled to measure the amount of Mg contained in the positive electrode. The measurement expressed as a relative value, where the amount of Mg in the cell in comparative example 1 is considered as 100, is shown in Table 2.

TABLE 1

| | | Additive powder | | Leaving-to-rest conditions | |
| | | | | | |
| | Composition of hydrogen-storing alloy powder | Substance | Amount added (mass-parts) | Time (hours) | Ambient temparature (° C.) |
|---|---|---|---|---|---|
| Example 1 | $(La_{0.20}Ce_{0.05}Pr_{0.35}Nd_{0.35}Y_{0.05})_{0.7}Mg_{0.3}Ni_{2.5}Co_{0.5}$ | ZnO | 2.0 | 1 | 25 |
| Example 2 | $(La_{0.20}Ce_{0.05}Pr_{0.35}Nd_{0.35}Y_{0.05})_{0.7}Mg_{0.3}Ni_{2.5}Co_{0.5}$ | ZnO | 5.0 | 1 | 25 |
| Example 3 | $(La_{0.20}Ce_{0.05}Pr_{0.35}Nd_{0.35}Y_{0.05})_{0.7}Mg_{0.3}Ni_{2.5}Co_{0.5}$ | $Zn(OH)_2$ | 2.0 | 1 | 25 |
| Example 4 | $(La_{0.20}Ce_{0.05}Pr_{0.35}Nd_{0.35}Y_{0.05})_{0.7}Mg_{0.3}Ni_{2.5}Co_{0.5}$ | ZnO | 2.0 | 2 | 25 |
| Example 5 | $(La_{0.20}Ce_{0.05}Pr_{0.35}Nd_{0.35}Y_{0.05})_{0.7}Mg_{0.3}Ni_{2.5}Co_{0.5}$ | ZnO | 2.0 | 2 | 40 |
| Example 6 | $(La_{0.20}Ce_{0.05}Pr_{0.35}Nd_{0.35}Y_{0.05})_{0.7}Mg_{0.3}Ni_{2.5}Co_{0.5}$ | ZnO | 8.0 | 1 | 25 |
| Comp. ex. 1 | $(La_{0.20}Ce_{0.05}Pr_{0.35}Nd_{0.35}Y_{0.05})_{0.7}Mg_{0.3}Ni_{2.5}Co_{0.5}$ | — | 0.0 | 1 | 25 |
| Comp. ex. 2 | $La_{0.90}Ce_{0.06}Pr_{0.02}Nd_{0.02}Ni_{4.0}Co_{0.8}Al_{0.3}Mn_{0.3}$ | ZnO | 2.0 | 1 | 25 |

TABLE 2

| | Operating voltage | | | Amount of Mg in positive electrode after 100 cycles |
|---|---|---|---|---|
| | 1st cycle | 100th cycle | Life | |
| Example 1 | 100 | 97 | 113 | 34 |
| Example 2 | 99 | 99 | 115 | 18 |
| Example 3 | 100 | 95 | 110 | 37 |
| Example 4 | 100 | 99 | 115 | 26 |
| Example 5 | 100 | 100 | 116 | 9 |
| Example 6 | 92 | 92 | 107 | 3 |
| Comp. ex. 1 | 100 | 86 | 100 | 100 |
| Comp. ex. 2 | 100 | 85 | 99 | 0 |

From Table 2, the following are clear:

(1) Comparison between the operating voltage after 100 cycles in example 1 and that in comparative example 1 shows that the addition of zinc oxide suppresses decrease in operating voltage due to repetition of the charge/discharge cycle.

(2) Comparison between the respective operating voltages after 100 cycles in examples 1, 2 and 6 shows that it is more desirable that the amount of zinc oxide added be in the range of 2 mass-parts to 5 mass-parts relative to 100 mass-parts of hydrogen-storing alloy powder.

(3) Comparison between the operating voltage after 100 cycles in example 1 and that in example 3 shows that also when the additive powder is zinc hydroxide, decrease in operating voltage due to repetition of the charge/discharge cycle is suppressed.

(4) Comparison between the operating voltage after 100 cycles in example 1 and that in example 4 shows that by extending the leaving-to-rest time from 1 hour to 2 hours, decrease in operating voltage due to repetition of the charge/discharge cycle is more suppressed. Further, comparison between the operating voltage after 100 cycles in example 4 and that in example 5 shows that by keeping the temperature of the environment in which the cell is left to rest at 40° C., decrease in operating voltage due to repetition of the charge/discharge cycle is further more suppressed. The reason why decrease in operating voltage due to repetition of the charge/discharge cycle is further suppressed by changing the leaving-to-rest conditions this way is thought to be that, by extending the leaving-to-rest time and/or raising the ambient temperature, the amount of zinc dissolving from the additive powder into the alkaline electrolyte increases and the amount of Mg dissolving from the hydrogen-storing alloy powder into the alkaline electrolyte decreases.

(5) Comparison between the operating voltage after 100 cycles in example 1 and that in comparative example 2 shows that when the hydrogen-storing alloy powder does not contain Mg, decrease in operating voltage due to repetition of the charge/discharge cycle cannot be suppressed by adding a zinc compound for the negative electrode.

The invention thus described, it will be obvious that the same may be varied in many ways. Such variations are not to be regarded as a departure from the sprit and scope of the invention, and all such modifications as would be obvious to one skilled in the art are intended to be included within the scope of the following claims.

What is claimed is:

1. An alkaline storage cell comprising an electricity generation set contained in a container, said set including a positive electrode, a negative electrode and an alkaline electrolyte, the negative electrode containing hydrogen-storing alloy powder, the hydrogen-storing alloy powder has a composition expressed by a general expression

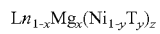

where Ln represents at least one element chosen from a group consisting of La, Ce, Pr, Nd, Pm, Sm, Eu, Gd, Tb, Dy, Ho, Er, Tm, Yb, Lu, Ca, Sr, Sc, Y, Ti, Zr and Hf, T represents at least one element chosen from a group consisting of V, Nb, Ta, Cr, Mo, Mn, Fe, Co, Al, Ga, Zn, Sn, In, Cu, Si, P and B, and x, y and z represent numerical values which meet $0<x<1$, $0\leqq y\leqq 0.5$ and $2.5\leqq z\leqq 4.5$, additive powder containing at least one of metal zinc and zinc compound in the range of 2 mass-parts to 5 mass parts relative to 100 mass-parts of hydrogen-storing alloy powder, and a binding agent for binding particles of the powders.

2. The alkaline storage cell according to claim 1, wherein the additive powder contains at least one zinc compound chosen from a group consisting of zinc carbonate, zinc sulfate, zinc hydroxide and zinc oxide.

3. The alkaline storage cell according to claim 1, wherein the amount of the additive powder contained in the negative electrode is in the range of 0.5 to 5.0 mass-parts relative to 100 mass-parts of the hydrogen-storing alloy powder.

4. The alkaline storage cell according to claim 1, wherein the alkaline electrolyte contains zinc atoms originating from the additive powder through an initial charging of the electricity generation set performed two hours or more after arranging the electricity set in the container.

5. The alkaline storage cell according to claim 1, wherein the alkaline electrolyte contains zinc atoms originating from the additive powder through heating the electricity generation set at 40° C. or higher after arranging the electricity generation set in the container, before performing an initial charging of the electricity generation set.

* * * * *